United States Patent [19]

Ayala et al.

[11] Patent Number: 4,798,856

[45] Date of Patent: Jan. 17, 1989

[54] PIGMENT DISPERSION IN RESIN

[75] Inventors: Jorge A. Ayala; George A. Joyce, both of Monroe, La.; David Crabbe, St. Louis, Mo.

[73] Assignee: Columbian Chemicals Co., Atlanta, Ga.

[21] Appl. No.: 118,216

[22] Filed: Nov. 6, 1987

[51] Int. Cl.$^4$ .......................... C08K 3/10; C08K 5/05; C08K 9/04; C08J 3/20
[52] U.S. Cl. ................................. 524/386; 523/200; 524/269; 524/388; 524/431; 524/435; 524/586
[58] Field of Search ............... 524/386, 388, 269, 431, 524/435, 586; 523/200

[56] References Cited

U.S. PATENT DOCUMENTS

| | | |
|---|---|---|
| 2,904,395 | 9/1959 | Downs et al. |
| 3,076,719 | 2/1963 | Whately et al. |
| 3,860,565 | 1/1975 | Barber ................................. 521/40 |
| 3,978,261 | 8/1976 | Ford et al. ........................... 523/201 |
| 4,002,593 | 1/1977 | Jones ................................... 523/318 |
| 4,116,924 | 9/1978 | Peabody ............................. 524/270 |
| 4,222,790 | 9/1980 | Dickerson . |
| 4,230,501 | 10/1980 | Howard et al. |
| 4,277,288 | 7/1981 | Lawrence . |
| 4,357,170 | 11/1982 | Brand . |
| 4,478,965 | 10/1984 | Concannon et al. ............... 523/218 |
| 4,495,216 | 1/1985 | Soerensen et al. ................. 523/204 |
| 4,599,114 | 7/1986 | Atkinson . |
| 4,681,637 | 7/1987 | Rademachers et al. |

OTHER PUBLICATIONS

Chemical Abstracts 96:7653f, 1982, "Inorganic Pigments and Fillers with Improved Plastic Dispersability".
Chemical Abstracts 101:193741c, 1984, "Effect of Solvents on Critical Pigment Volume Concentration of Synthetic Red Iron Oxide in Long Oil Alkyd", by Viscometric Measurements.
Chemical Abstracts 101:193742d, 1984, "Treatment of a Titanium White Surface by Organics and Its Evaluation".
Chemical Abstracts 104:13929a, 1986, "Surface Treatment of Magnetic Powder".

Primary Examiner—Herbert J. Lilling
Attorney, Agent, or Firm—Jones, Askew & Lunsford

[57] ABSTRACT

There is provided a pigment concentrate dispersible in plastics and having a substantially improved characteristic extrusion screen life, comprising a dispersion in a resin carrier of an inorganic pigment of the type having a hydrophilic surface, having on its surface in an effective amount a surfactant of the type characterized by an attached polar terminus, in relation to the surface of the pigment, and an unattached nonpolar terminus, in relation to the carrier resin, or of the type characterized by a high molecular weight surface blocking agent. Such pigments include iron oxide pigments, red iron oxide pigment, yellow iron oxide pigment, black iron oxide pigment, divalent ferrite pigments, zinc ferrite pigment, and magnesium ferrite pigment. Such surfactants include dimethyl polysiloxane, isopropyl triisostearoyl titanate, trimethylol propane, trimethylol ethane, and low molecular weight polyethylene. In a preferred concentrate, pigment loading is about 50%, the pigment comprises red iron oxide, the carrier comprises low density polyethylene, and the surfactant comprises trimethylol propane or trimethylol ethane with a treatment level of 0.5% by weight of pigment.

12 Claims, 3 Drawing Sheets

PIGMENT DISPERSION IN RESIN

FIELD OF THE INVENTION

This invention relates generally to inorganic pigments and concentrates for plastics and particularly to iron oxide and ferrite pigment compositions readily dispersible in thermoplastics.

BACKGROUND OF THE INVENTION

Inorganic pigments such as iron oxides are commonly used in coloring plastics, such as low density polyethylene, by incorporation of the pigment with the resin by intensive mixing, such as by compounding in a Banbury or two-roll mill, or less intensive mixing such as twin-screw preplasticizing followed by extrusion, injection molding, or film blowing. A key performance property of the pigment is the dispersibility of the pigment in the resin, which is a measure of the ease with which the pigment can be intimately mixed with the resin. Large aggregates of undispersed pigment can cause surface specks, poor gloss, and color streaks on molded parts as well as being readily visible, and can cause weak spots and holes in blown film.

A pigment concentrate can be prepared by mixing a carrier resin, usually the same as or at least compatible with the eventual matrix resin, and the pigment at a loading of typically 40 to 50% in a Banbury or two-roll mill, followed by pelletizing. Later in use, the pigment is let down from the pigment loading to a concentration in the matrix resin of typically 5% or less, by mixing the concentrate with the matrix resin during melt processing, such as by extrusion or injection molding.

Additionally, in compounding and processing plastics, the material about to be extruded is normally passed through a screen to remove coarse particles. Large amounts of agglomerates will cause rapid screen blockage leading to low process throughputs and excessive equipment down time for screen replacement.

Several tests are used to determine pigment dispersion in a carrier resin. In the screen life test, compound is extruded through a screen, typically 150 or 325 mesh, and the time is measured until a predetermined pressure drop across the screen is achieved. This time represents screen life, with increasing time being desirable.

Another pigment dispersion test is the film quality test, which involves compounding pigment in resin, then letting down the concentrated compound in an extruder, and then blowing film from the extrudate. The film, typically 2 to 6 mils in thickness, can be visually examined for specks of undispersed pigment.

Also, X-radiography can be used to examine plaques of pigment concentrates to detect areas of insufficient pigment dispersion. On the radiograph, agglomerates of undispersed inorganic pigment, which have relatively high specific gravity, show as dark specks.

Surfactants generally have been used to enhance the processing of inorganic pigments in various respects. The following patents are typical.

U.S. Pat. No. 4,599,114 issued July 8, 1986, to Atkinson for "Treatment of Titanium Dioxide in Other Pigments to Improve Dispersability" discloses the use as a surfactant of the reaction product of a diamine, a carboxylic acid, and a fatty acid to improve dispersibility of titanium dioxide pigment in a resin medium.

U.S. Pat. No. 4,277,288 issued July 7, 1981, to Lawrence for "Fluidized Granulation of Pigments Using Organic Granulating Assistant" discloses the use of high boiling organic surfactants to promote agglomeration of pigment particles prior to dispersing the pigment in the final application medium.

U.S. Pat. No. 4,681,637 issued July 21, 1987 and assigned to Bayer AG, for "Process to Make Yellow-Brown Zinc Ferrite Pigments" discloses the use of trimethylol propane and methylhydrogen polysiloxane as grinding agents for zinc ferrites to improve color values and dispersibility.

U.S. Pat. No. 4,230,501 issued Oct. 28, 1980, to Howard et al for "Pigments Dispersible in Plastics" discloses pigments mixed with waxy materials to promote dispersibility of pigment concentrate in thermoset and thermoplastic resins.

SUMMARY OF THE INVENTION

It is an object of the invention to provide a surface modifying treatment for inorganic pigments to promote dispersibility in a resin.

It is another object to provide a pigment concentrate of enhanced dispersibility in plastics which includes a dispersion in a resin carrier of inorganic pigment of the type having a hydrophilic surface and a surfactant on the surface of the pigment which is functional as a dispersant and which is present in an effective amount.

It is another object to provide such pigment concentrates having a substantially improved extrusion screen life.

It is another object to provide an iron oxide pigment concentrate in thermoplastic of such enhanced dispersion characteristics.

It is another object to provide a divalent ferrite pigment concentrate in thermoplastic of such enhanced dispersion characteristics.

Accordingly, there is provided a pigment concentrate dispersible in plastics and having a substantially improved characteristic extrusion screen life, comprising a dispersion in a resin carrier of an inorganic pigment of the type having a hydrophilic surface, and having on its surface in an effective amount a surfactant of the type characterized by an attached polar terminus, in relation to the surface of the pigment, and an unattached nonpolar terminus, in relation to the carrier resin; or a surfactant of the type characterized by a high molecular weight surface blocking agent.

Additionally, the invention comprehends such treated pigments and processes by which they are treated.

Such concentrates are further characterized by a characteristic extrusion screen life which is substantially increased over that of a substantially similar comparison concentrate but not having the surfactant.

Such pigments include iron oxide pigments, yellow iron oxide pigment, black iron oxide pigment, divalent ferrite pigments, zinc ferrite pigment, and magnesium ferrite pigment. Representatively, the pigments have a BET surface area of about 3 to 20 square meters per gram.

Such surfactants include dimethyl polysiloxane, isopropyl triisostearoyl titanate, trimethylol propane, trimethylol ethane, and low molecular weight polyethylene. Representative treatment levels are about 0.1 to 1.0% by weight of the pigment.

Preferred resins include polyethylene, polypropylene, polystyrene, acrylonitrile-butadiene-styrene copolymer, polyvinyl chloride, and polyethylene terephthalate.

In a preferred concentrate, pigment loading is about 50%, the pigment comprises red iron oxide, and carrier comprises low density polyethylene, and the surfactant comprises trimethylol propane or trimethylol ethane with a treatment level of about 0.5% by weight of pigment.

Other features, objects, and advantages of the invention will become apparent from the following detailed description, drawings, and claims.

DETAILED DESCRIPTION OF THE INVENTION

Figure 1:
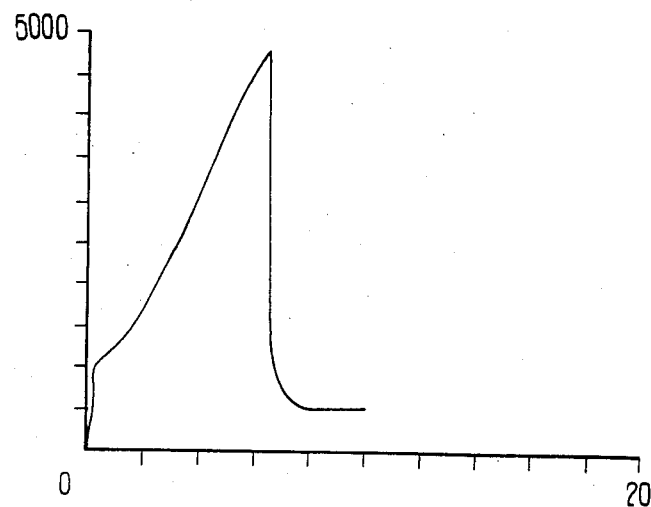
FIG. 1 illustrates the results of a screen life test for red iron oxide pigment without surface modifying treatment, in accordance with conventional practice, compounded in 50% low density polyethylene.

Pigment particles treated with surfactant in accordance with the invention may be advantageously added to essentially any plastic or resin, including rubber compounds, such as by adding the treated pigment particles to the plastic while the plastic is in a liquid or compoundable form.

Resins

Suitable plastics and resins include thermoplastic and thermosetting resins, rubber compounds, and thermoplastic elastomers. The plastics and resins containing the treated pigment particles of the invention may be utilized in molding processes, such as extrusion, injection, calendaring, casting, compression, lamination, and transfer molding, and in coatings, such as lacquers, film bonding coatings, powder coating, coatings containing only pigment and resin, and paints, and in inks, dyes, tints, impregnations, adhesives, caulks, sealants, rubber goods, and cellular products.

By way of example, suitable plastics and resins include alkyd resins, oil modified alkyd resins, unsaturated polyesters, natural oils, epoxides, nylons, thermoplastic polyesters, polycarbonates, polyethylenes, polybutylenes, polystyrenes, styrene butadiene copolymers, polypropylenes, ethylene-propylene co- and terpolymers, silicone resins, natural and synthetic rubbers, acrylics, phenolic resins, polyoxymethylene, polyurethanes, polysulfones, polysulfide rubbers, nitrocelluloses, vinyl butyrates, vinyls, ethyl cellulose, cellulose acetates and butyrates, viscose rayon, shellac, waxes, ethylene copolymers, such as ethylene-vinyl acetate, ethylene-acrylic acid, and ethylene-acrylate copolymers, and the like.

Plastics and resins which are of special interest are high density, low density, and linear low density polyethylenes, polypropylenes, polystyrenes, acrylonitrile-butadiene-styrene copolymer, polyvinyl chloride, and polyethylene teraphthalate.

Pigments

Types of pigments which benefit from the treatment of the present invention include red iron oxides (alpha ferric oxide) which are typically produced by thermal decomposition of ferrous sulfate. These red iron oxides are commonly referred to as copperas reds. Red iron oxides are also conventionally produced by other processes including dehydration of yellow iron oxide (goethite), calcination of magnetite, and direct precipitation.

Other inorganic pigments are within the scope of this invention including yellow iron oxide (goethite), black iron oxide (magnetite), and divalent ferrites such as zinc and magnesium ferrites. Such pigments possess hydrophilic surfaces.

Zinc ferrites (such as commercial pigment grade Mapico Tan 10A from Columbian Chemicals Company) are typically produced by processes as disclosed in U.S. Pat. Nos. 2,904,393 and 4,222,790. These zinc ferrites show substantially improved dispersibility in plastics when treated in accordance with this invention as discussed below.

Representatively, pigments within the scope of this invention have surface areas of about 3 to 20 square meters per gram as determined by the conventional BET method, and have a typical particle shape that is generally acicular, spheroidal or cubical.

Surfactants

It is believed that suitable surfactants for the surface treatments of this invention block active sites on the pigment surface which prevent the wetting of the pigment by nonpolar matrices. In other words, specific active sites, which are probably of high polarity, make the pigment surface incompatible with low polarity or nonpolar matrices. By covering or by attaching a molecule to such active sites, the compatibility of the pigment with a relatively low polarity or nonpolar matrix is highly increased.

Thus, a suitable surfactant will attach with a high specificity to such active sites. Conversely, the free end of the surface treating agent which is not attached to the surface of the pigment must be a low polarity moiety. Representatively, titanate coupling agents (Example 8), dimethyl polysiloxanes (Example 4), trimethylol ethane (Examples 2 and 7), and trimethylol propane (Example 3) act in this manner.

As discussed below in connection with Examples 2 and 3 and FIGS. 2 and 3, the outstanding performance of trimethylol ethane and trimethylol propane relates to its highly polar (three hydroxyls) terminus attaching firmly to the oxide surface and leaving the short alkane moiety protruding therefrom and available for improvement of compatibility with a nonpolar matrix, such as polyolefin.

Figure 9:
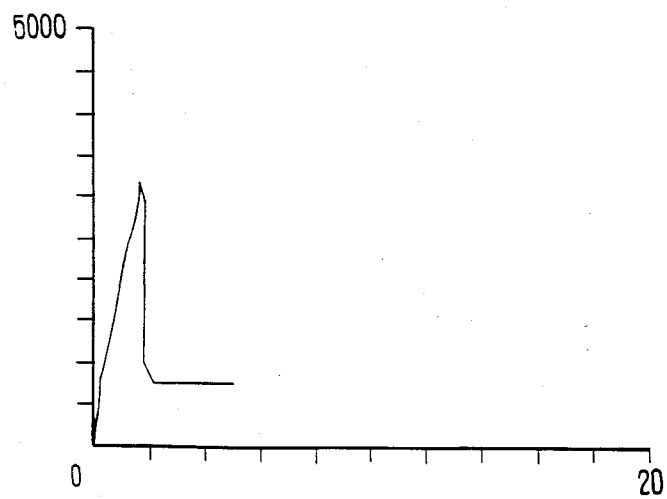
FIG. 9 illustrates screen life testing for tan zinc ferrite pigment, treated with 1% pentaerythritol and compounded in 50% low density polyethylene.

On the other hand, as discussed below in connection with Example 9 and FIG. 9, the poor performance of pentaerythritol relates to a surface treatment in which the surfactant attaches to the surface of the pigment, but the unattached moiety is polar. Pentaerythritol attaches to the iron oxide in substantially the same manner as trimethylol propane or trimethylol ethane. However, the unattached moiety in the case of pentaerythritol is a polar OH group which causes a negative effect on the disperson of iron oxide in polyethylene.

Other suitable surfactants are of high molecular weight and will cover the entire surface of the pigment. Thus, by covering the entire surface, the active sites are blocked. If the high molecular weight agent is highly nonpolar, it will increase the compatibility of the pigment with low or nonpolar matrices. Representatively, low molecular weight polyethylene (Example 5) acts in this manner in the treatment of iron oxides. Low molecular weight polyethylenes, also termed polyethylene waxes, are commercially available as grade A-C polyethylene from Allied Corporation. Preferably, the low molecular weight polyethylene is of the emulsifiable type.

Surface treatment methods within the scope of the invention include incorporating the surfactant into a pigment slurry prior to drying, treatment of dried pigments prior to milling, and intensive mixing with finished pigment.

The lower quantity of additive to be effective is that amount which produces a monolayer coverage of the pigment surface The upper effective quantity accounts for occurrence of excess additive which could volatilize in compounding, migrate in films or cause pigment flocculation. It has been found that treatment levels of 0.1 to 1.0% by weight give excellent performance for pigments with surface areas of about 3 to 20 square meters per gram. Most preferred is a treatment level in the range of about 0.3 to 0.5%.

In the Examples discussed below, comparative testing was conducted for the effect on extrusion screen life for pigment concentrate versus pigment surfactant treatment. Generally, the test procedure involves 3 steps. First, pigment is surfactant treated (except for the control specimen.) Second, a pigment-thermoplastic concentrate is prepared. Third, the concentrate is tested for extrusion screen life.

In the Figures, the numbering of the figures corresponds to the numbering of the Examples. Thus, FIG. 1 illustrates the results of Example 1. The Figures are x-y charts of the screen life testing in which the ordinate represents extrusion back-pressure and is scaled to 5000 psi, and the abcissa represents time elapsed during the pressure buildup. During each test, pressure buildup was monitored for up to 20 minutes.

EXAMPLE 1

FIG. 1 illustrates the results of Example 1 which refers to the control example in which red iron oxide pigment was not treated with a surfactant and was prepared in conventional manner. Pigment concentrate was prepared by compounding red iron oxide pigment in low density polyethylene at a 50% pigment loading. The red iron oxide was commercial pigment grade R297 from Columbian Chemicals Company. The low density polyethylene was further characterized as having a Melt Index of 10.0.

The red pigment powder was compounded with low density polyethylene in a conventional manner. First, the pigment powder was compounded with low density polyethylene granules in equal weight portions by mixing in a Banbury mill, beginning at a starting temperature of about 100° F. and reaching a final temperature of about 240° F. Then, the preliminary compound was subjected to 2 passes through a conventional two-roll mill of size 8×18 inches and at a roll spacing of about 0.070 inches and a roll temperature of about 150° F. Finally, the resulting rolled concentrate was granulated in a Plasto grinder. The concentrate was further characterized by a Melt Flow of 62.8, as determined in accordance with test procedure ASTM D1238-Condition N.

Then, the control concentrate of Example 1 was subjected to screen life testing. In the conventional procedure for determining screen life, the granulated thermoplastic concentrate is screw extruded through a 150 mesh screen while monitoring the back-pressure buildup. Extrusion screw speed is about 100 rpm and extrusion die temperature is about 163° C. The extrusion screen is located just down course of the die and is backed by a breaker plate of relatively large diameter holes and an 80 mesh backing screen. Generally, as agglomerates of the dispersed phase are accumulated on the extrusion screen, resistance to extrusion flow increases. In actual practice, flow resistance eventually increases to the point where extrusion flow slows to an impracticable rate. Test screen life is equated to the time required to develop a back-pressure of 3000 psi. For the control concentrate, FIG. 1 shows a screen life to 3000 psi of about 4 minutes. Pressure continued to increase steeply and at 7 minutes had reached 5000 psi at which time the extruder was stopped.

EXAMPLES 2 to 5

These are positive examples showing substantial improvement over the control Example 1. The same procedures were followed for preparing and testing red iron oxide pigment concentrated in low density polyethylene, except that the pigment powder was preliminarily surfactant treated with the intent to improve the dispersion of pigment in the low density polyethylene carrier resin. Generally, the more uniform the dispersion, the less likely that there will be agglomerates or clusters of the dispersed phase, and the less likely that extrusion screening will be obstructed.

Figure 2:
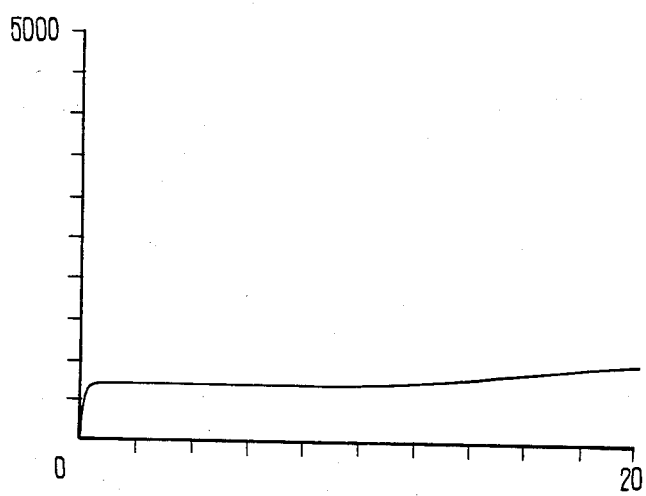
FIG. 2 illustrates screen life testing for red iron oxide pigment, treated with 0.5% trimethylol ethane and compounded in 50% low density polyethylene.

FIG. 2 shows a dramatic flattening of the screen life curve for red iron oxide pigment treated with 0.5% trimethylol ethane, and compounded in 50% low density polyethylene. In the surfactant treatment, the trimethylol ethane was preliminarily dissolved in water at a concentration of about 80% and added to the dry pigment. The pigment and the diluted trimethylol ethane were vigorously mixed in a Henschel mixer after a nitrogen purge. No further drying of the pigment was necessary. It is seen from the substantially flat pressure-time profile of FIG. 2 that screen life is extended indefinitely.

The surfactant in each of these examples was added on the basis of weight percentage of the pigment charged to the mixer. For example for a charge of 2000 grams of pigment, about 20 grams of surfactant mixed with the pigment represents a 1% treatment.

Figure 3:
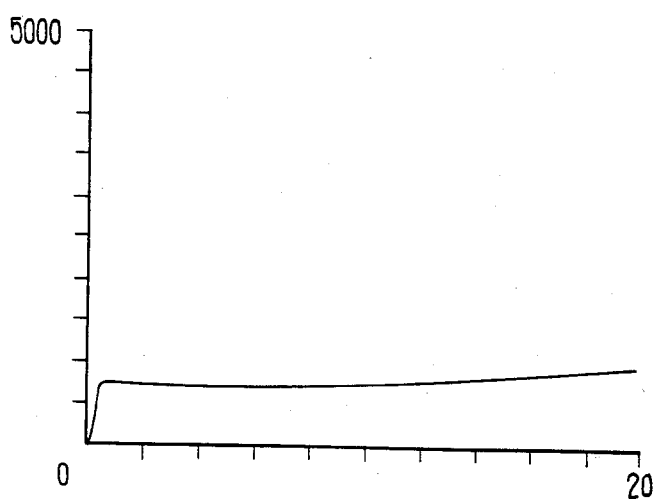
FIG. 3 illustrates screen life testing for red iron oxide pigment, treated with 0.5% trimethylol propane and compounded in 50% low density polyethylene.

FIG. 3 shows a dramatic flattening of the screen life curved for red iron oxide pigment treated with 0.5% trimethylol propane, and compounded in 50% low density polyethylene. The trimethylol propane was preliminarily dissolved in water at a concentration of about 80% and added to the dry pigment and blended in a Henschel mixer. No further drying of the pigment was necessary. It is seen from the substantially flat pressuretime profile of FIG. 3 that screen life is extended indefinitely.

Figure 4:
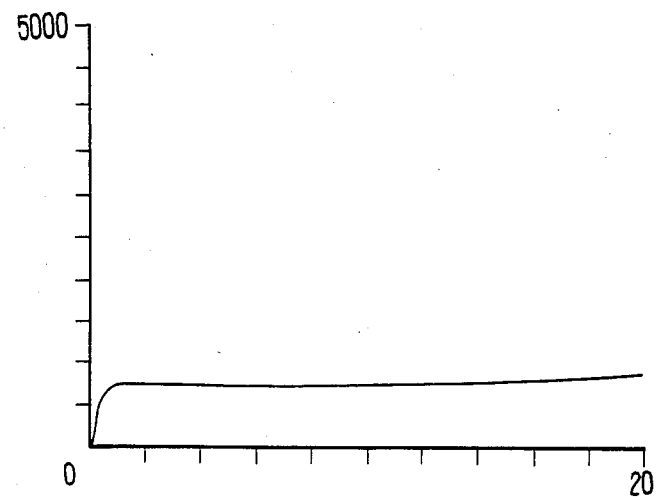
FIG. 4 illustrates screen life testing for red iron oxide pigment, treated with 1% silicone surfactant and compounded in 50% low density polyethylene.

FIG. 4 also shows a dramatic flattening of the screen life curve for red iron oxide pigment treated with 1% dimethyl polysiloxane, and compounded in 50% low density polyethylene. The silicone surfactant was added directly to the dry pigment and blended in a Henschel mixer. It is seen from the substantially flat pressure-time profile that screen life is extended indefinitely.

Figure 5:
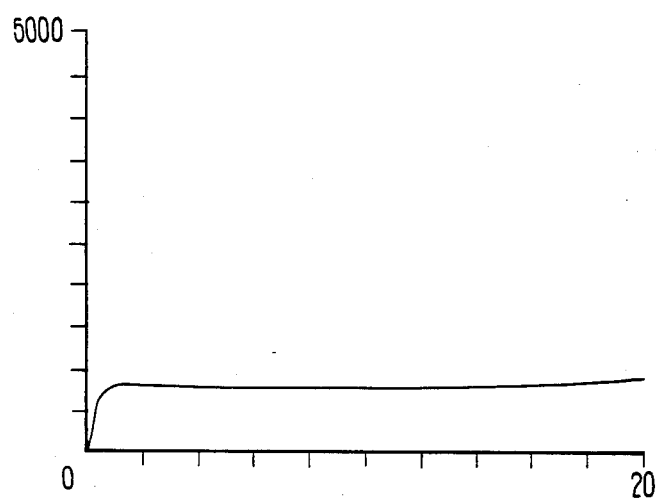
FIG. 5 illustrates screen life testing for red iron oxide pigment, treated with 1% low molecular weight polyethylene and compounded in 50% low density polyethylene.

FIG. 5 illustrates screen life testing for red iron oxide pigment treated with 1% low molecular weight polyethylene, and compounded in 50% low density polyethylene. As discussed above, this surfactant is of the high molecular weight type. The 1% low molecular weight polyethylene was added to the pigment in emulsion form which contained about 30% polyethylene. Then, the pigment was dried prior to compounding. It is seen from the substantially flat pressure-time profile that screen life is extended indefinitely.

Example 6

Figure 6:
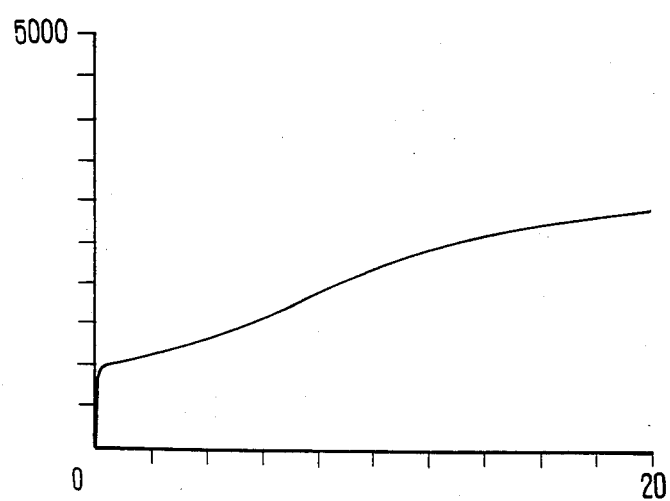
FIG. 6 illustrates screen life testing for tan zinc ferrite pigment without surface modifying treatment, in accordance with conventional practice, compounded in 50% low density polyethylene.

This is a control Example, relative to the following examples, for tan zinc ferrite pigment compounded in 50% low density polyethylene, which was conducted in a substantially similar manner to the control Example 1 except that screen life testing was through 325 mesh screen. The pigment was grade Mapico Tan 10A from Columbian Chemicals Company. For this control concentrate, FIG. 6 shows a screen life to 3000 psi of about 20 minutes.

EXAMPLES 7 and 8

These are positive examples showing substantial improvement over the control Example 6. The foregoing procedures were followed for preparing and testing tan zinc ferrite pigment concentrated in low density polyethylene, except that screen life testing was through 325 mesh screen.

Figure 7:
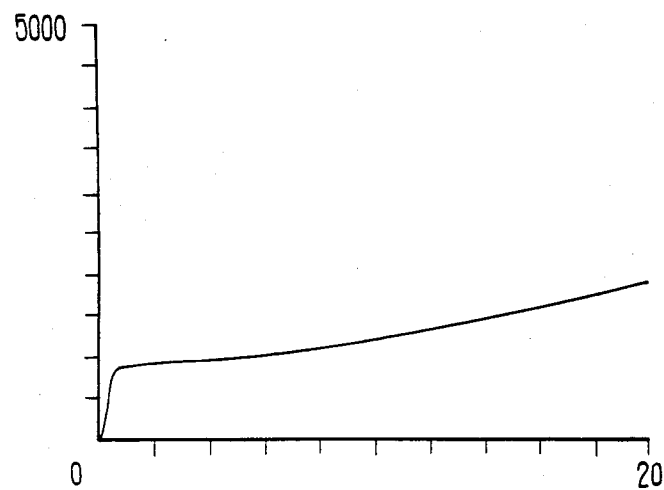
FIG. 7 illustrates screen life testing for tan zinc ferrite pigment, treated with 1% trimethylol ethane and compounded in 50% low density polyethylene.

FIG. 7 shows a substantial improvement of the screen life curve for tan zinc ferrite pigment treated with 1% trimethylol ethane, and compounded in 50% low density polyethylene. The trimethylol ethane was preliminarily dissolved in water at a concentration of about 80% and added to the dry pigment and blended in a Henschel mixer. No further drying of the pigment was necessary. It is seen from the pressure-time profile that screen life is extended substantially. The linearly extrapolated screen life to 3000 psi is about 31 minutes.

Figure 8:
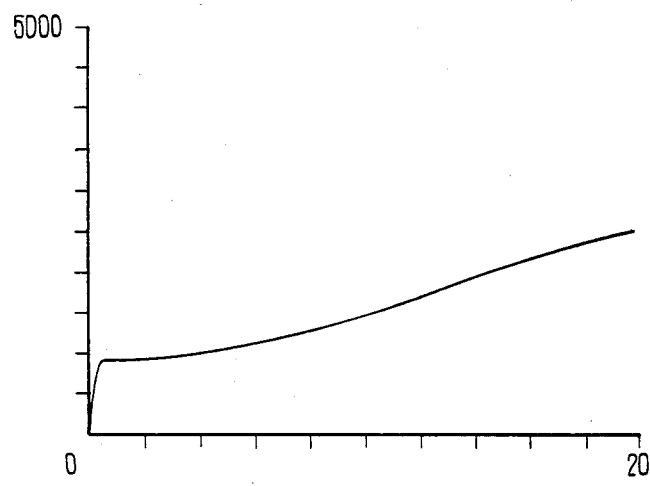
FIG. 8 illustrates screen life testing for tan zinc ferrite pigment, treated with 1% titanate surfactant and compounded in 50% low density polyethylene.

FIG. 8 shows a substantial improvement of the screen life curve for tan zinc ferrite pigment treated with 1% isopropyl triisostearoyl titanate, and compounded in 50% low density polyethylene. The titanate surfactant is commercially available as Kenrich TTS. The titanate surfactant was added directly to the dry pigment and blended in a Henschel mixer. The surfactant was added on the basis of weight percentage of the pigment charged to the mixer. It is seen from the pressure-time profile that screen life is extended substantially. The linearly extrapolated screen life to 3000 psi is about 28 minutes.

EXAMPLE 9

This example is a negative example showing a substantial decrease in dispersiblity relative to the control Example 6. The surfactant was 1% pentaerythritol dissolved in about 175 millilters of water. The poor performance of pentaerythritol relates to its unattached polar moiety, a polar OH group, which causes a negative effect on the dispersion of iron oxide in polyethylene.

While the invention has been described in detail with particular reference to the disclosed embodiments, it is to be understood that variations and modifications may be utilized without departing from the principles and scope of the invention as defined by the following claims.

What is claimed is:

1. A pigment concentrate of enhanced dispersibility in plastics comprising a dispersion in a resin carrier of inorganic pigment of the type having a hydrophilic surface selected from the group consisting of divalent ferrite pigment and iron oxide pigment, said pigment including a surfactant selected from the group consisting of trimethylol ethane and trimethylol propane which is functional as a dispersant in a relatively nonpolar matrix and which is present on the surface of the pigment in an effective amount.

2. The pigment concentrate of claim 1 further characterized by a characteristic extrusion screen life substantially increased over that of a substantially similar comparison concentrate but not having said surfactant.

3. The pigment concentrate of claim 1, wherein said pigment comprises red iron oxide, yellow iron oxide, or black iron oxide.

4. The pigment concentrate of claim 1, wherein said pigment comprises zinc ferrite or magnesium ferrite.

5. The pigment concentrate of claim 1 wherein said surfactant is of the type which comprises an attached polar terminus, in relation to the surface of said pigment, and an unattached nonpolar terminus, in relation to said carrier resin.

6. The pigment concentrate of claim 1 or 5 wherein said surfactant is present in an amount of about 0.1 to 1% by weight of the pigment.

7. The pigment concentrate of claim 6 wherein said pigment comprises a BET surface area of about 3 to 20 square meters per gram.

8. The pigment concentrate of claim 6 wherein said surfactant is present in an amount of about 0.3 to 0.5% by weight of the pigment.

9. The pigment concentrate of claim 1 wherein said resin comprises polyethylene, polypropylene, polystyrene, acrylonitrile-butadiene-styrene copolymer, polyvinyl chloride, or polyethylene terephthalate.

10. The pigment concentrate of claim 1 wherein said pigment comprises red iron oxide, said carrier resin comprises polyethylene, and said surfactant comprises trimethylol ethane or trimethylol propane.

11. A pigment concentrate of substantially increased characteristic extrusion screen life, comprising a dispersion in a resin carrier of iron oxide pigment or divalent ferrite pigment, said pigment having on its surface in an effective amount a surfactant of the type characterized by an attached polar terminus, in relation to the surface of the pigment, and an unattached nonpolar terminus, in relation to the carrier resin selected from the group consisting of trimethylol ethane and trimethylol propane.

12. A pigment having substantially improved dispersibility in a resin carrier, comprising red iron oxide pigment, yellow iron oxide pigment, black iron oxide pigment, zinc ferrite pigment, or magnesium ferrite pigment, said pigment including a surfactant functional as a dispersant in a relatively nonpolar matrix which is present on the surface of the pigment in an effective amount and which comprises trimethylol propane or trimethylol ethane.

* * * * *